(12) United States Patent
Okawa

(10) Patent No.: US 11,470,486 B2
(45) Date of Patent: Oct. 11, 2022

(54) WIRELESS COMMUNICATION SYSTEM

(71) Applicant: NEC CORPORATION, Tokyo (JP)

(72) Inventor: Takashi Okawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 25 days.

(21) Appl. No.: 17/097,743

(22) Filed: Nov. 13, 2020

(65) Prior Publication Data

US 2021/0168626 A1    Jun. 3, 2021

(30) Foreign Application Priority Data

Dec. 3, 2019  (JP) .............................. JP2019-218945

(51) Int. Cl.
*H04W 24/02* (2009.01)
(52) U.S. Cl.
CPC .................................. *H04W 24/02* (2013.01)
(58) Field of Classification Search
CPC . H04W 24/02; H04W 24/04; H04W 52/0206; H04L 5/0053
See application file for complete search history.

(56) References Cited

U.S. PATENT DOCUMENTS 10,470,055 B1 *  11/2019  Somashekar  .........  H04W 24/02

FOREIGN PATENT DOCUMENTS

JP    2003-318795 A    11/2003

OTHER PUBLICATIONS

Roderic L. Olsen, et al., "The $aR^b$ Relation in the Calculation of Rain Attenuation", IEEE Transactions on Antennas and Propagation, vol. AP-26, No. 2, Mar. 1978, pp. 318-329.
Recommendation ITU-R P.838-3, "Specific attenuation model for rain for use in prediction methods", 1992-1999-2003-2005, pp. 1-8.
International Telecommunication Union, Recommendation ITU-R P.837-7, "Characteristics of precipitation for propagation modelling", Jun. 2017, pp. 1-8.

* cited by examiner

*Primary Examiner* — Wayne H Cai
(74) *Attorney, Agent, or Firm* — Sughrue Mion, PLLC

(57) ABSTRACT

A wireless communication system capable of dealing with weather that changes abruptly and capable of keeping communication quality at a certain standard or higher is provided. The wireless communication system comprises a first base station, and a second base station that performs communication mutually with the first base station. Each of the first base station and the second base station includes a transceiver unit being connected to an antenna for the communication, and a processing unit that controls the transceiver unit for the communication by referring to meteorological data in a place where the base station is located. The processing unit of the first base station, at a predetermined cycle, accumulates a set of meteorological data in a place where the first base station is located, and data on received electric power for the communication by referring to the meteorological data.

13 Claims, 13 Drawing Sheets

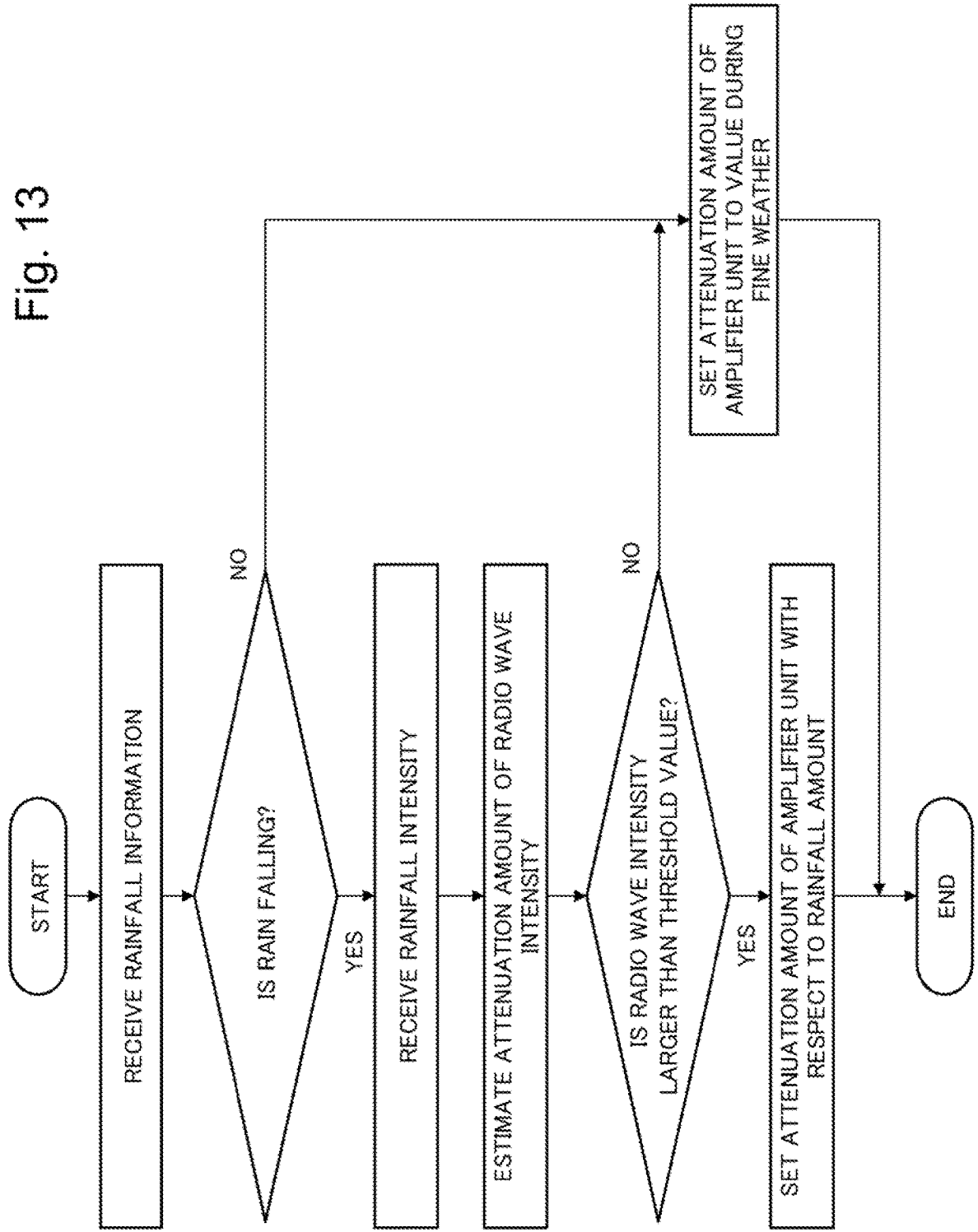

WIRELESS COMMUNICATION SYSTEM

This application is based upon and claims the benefit of priority from Japanese Patent Application No. 2019-218945, filed on Dec. 3, 2019, the disclosure of which is incorporated herein in its entirety by reference.

TECHNICAL FIELD

The present invention relates to a wireless communication system, and particularly relates to communication between wireless base stations.

BACKGROUND ART

In point-to-point mobile phone intra-base-station communication employing a high frequency band, securing a propagation distance and securing communication quality even in a bad propagation environment such as rainy weather have been demanded.

FIG. 12 is a graph illustrating a rainfall attenuation amount with respect to a frequency by the International Telecommunication Union-Radiocommunication Sector (ITU-R) P.838-3 (ITU-R P.838-3) relating to a rainfall attenuation coefficient. FIG. 12 illustrates a relation of a rainfall attenuation amount with respect to a frequency in each of cases that a rainfall amount is 0.25 mm/hr, 2.5 mm/hr, 10 mm/hr, 25 mm/hr, and 100 mm/hr. As illustrated in FIG. 12, as a frequency increases, a rainfall attenuation amount increases. In a situation that a base station for a mobile phone becomes five generation (5G) and a frequency shifts to 28 GHz and 39 GHz for performing large-capacity communication, backhaul communication between base stations also needs a further large capacity. In response to this demand, consideration on use of a higher frequency range where a signal band such as an E-band (71 to 86 GHz), a W-band (92 to 114.5 GHz), and a D-band (130 to 174.8 GHz) can be easily secured is progressing.

When line design is performed based on a premise of rainfall, performing automatic transmit power control (ATPC) enables securing communication quality similar to a case of a low frequency band, even in the above-described millimeter wave band. However, generally, in a millimeter wave band, atmospheric attenuation is large, it is difficult to secure a propagation distance, and thus communication design may be performed based on a premise of fine weather. In an existing technique so far, as described in the ITU-R P.837 relating to a rainfall intensity estimation method, a rainfall amount in a certain area has been estimated on a global scale, and a distribution on a size of raindrops and the like has been acquired in each area. A communication line has been designed by using these parameters, after durability of communication quality has been secured.

Olsen, R. L. et al., "The aRb Relation in the Calculation of Rain Attenuation", IEEE TRANSACTIONS ON ANTENNAS AND PROPAGATION, Vol. AP-26, No. 2, pp. 318 to 329, March 1978 relates to calculation of an empirical relational expression between a rainfall rate and rainfall attenuation. From description in Olsen, R. L. et al., "The aRb Relation in the Calculation of Rain Attenuation", IEEE TRANSACTIONS ON ANTENNAS AND PROPAGATION, Vol. AP-26, No. 2, pp. 318 to 329, March 1978, it is understood that an attenuation amount differs depending on a size and a shape of raindrops, even with use of a common scale being a rainfall amount.

Japanese Patent Application Laid-Open No. 2003-318795 (JP2003-318795A) relates to a wireless device, and proposes that a wireless device having good performance is achieved without depending on a weather condition by utilizing weather information in a place where the wireless device exists. JP2003-318795A proposes control such that rainfall intensity information is received from a rainfall sensor, an attenuation amount of a radio wave intensity by rainfall is estimated, and, when the estimated attenuation amount of the radio wave intensity is large, an amplification amount of an amplifier unit is widely increased in comparison with a default value during fine weather, and when the estimated attenuation amount is small, an amplification amount of the amplifier unit is narrowly increased in comparison with the default value during fine weather.

As illustrated in FIG. 13, the wireless device in JP2003-318795A receives rainfall information, and determines whether rain is falling. When the determination result is NO, the wireless device sets an attenuation amount of the amplifier unit to a value during fine weather. When the determination result is YES, the wireless device receives a rainfall intensity, and estimates an attenuation amount of a radio wave intensity. Then, the wireless device determines whether a propagation intensity is larger than a threshold value, and when the determination result is YES, the wireless device sets an attenuation amount of the amplifier unit to a value based on a rainfall amount.

In point-to-point mobile phone intra-base-station communication employing a high frequency band, it is required to secure a propagation distance, and secure communication quality even in a bad propagation environment such as rainy weather. Regarding the weather, conditions such as rainfall have been changing due to abnormal weather, guerrilla heavy rain, and the like in recent years. Specifically, accompanied by recent abnormal weather, local rainfall occurs. This is so-called guerrilla heavy rain. Compared with normal rain, the guerrilla heavy rain has features that raindrops are large, and the weather changes abruptly. When these abnormal weathers occur, even with use of a communication device equipped with a meteorometer, a calculation speed and a setting speed do not catch up with a change in weather. Meteorological data are available any time at a public institution being the Japan Meteorological Agency. However, advance information serving as a so-called weather forecast may be meaningless. Further, information to be transmitted by a public institution is not information immediately before rainfall or local information.

However, the above-described communication device according to the background art involves the following problem.

In the wireless device in JP2003-318795A, it is necessary to estimate an attenuation amount with respect to a rainfall amount. However, an attenuation amount is not affected only by a rainfall amount at a time of raining. Therefore, there is a problem that controlling the wireless device by estimating an attenuation amount with respect to a rainfall amount may not deal with unexpected rain or various shapes of raindrops, for example. For example, the above-described guerrilla heavy rain has features that raindrops are large compared with normal rain, and the weather changes abruptly. There is a problem that controlling the wireless device according to an estimated attenuation amount by estimating an attenuation amount of a radio wave intensity by rainfall, as proposed in JP2003-318795A, may not deal with unexpected rain or various shapes of raindrops.

There is a problem that it is difficult to keep communication quality of the wireless device at a certain standard or higher, since an attenuation amount of a radio wave intensity with respect to a rainfall amount does not match with a case of unexpected rain or various shapes of raindrops. Further, it is also desired to deal with attenuation resulting from another phenomenon, in addition to attenuation resulting from a rainfall amount at a time of raining, and attenuation resulting from unexpected rain or various shapes of raindrops.

SUMMARY

In view of the above, an object of the present invention is to provide a wireless communication system capable of dealing with even weather that changes abruptly, and capable of keeping communication quality at a certain standard or higher.

In order to achieve the above object, a wireless communication system according to the present invention includes: a first base station; and a second base station that performs communication mutually with the first base station, wherein each of the first base station and the second base station comprises a transceiver unit being connected to an antenna for the communication, and a processing unit that controls the transceiver unit for the communication by referring to meteorological data in a place where the base station is located, and the processing unit of the first base station, at a predetermined cycle, accumulates a set of meteorological data in a place where the first base station is located, and data on received electric power for the communication by referring to the meteorological data, when there is a change in the meteorological data, calculates a control parameter for controlling the transceiver unit by calling a past parameter relating to meteorological data, and causes the calculated control parameter to be transmitted to the second base station.

A base station according to the present invention is a base station that performs communication mutually with an opposing base station, and comprises:

a transceiver unit being connected to an antenna for the communication; and a processing unit that controls the transceiver unit for the communication by referring to meteorological data in a located place, wherein the processing unit, at a predetermined cycle, accumulates a set of meteorological data in the located place, and data on received electric power for the communication by referring to the meteorological data, when there is a change in the meteorological data, calculates a control parameter for controlling the transceiver unit by calling a past parameter relating to meteorological data, and causes the calculated control parameter to be transmitted to the opposing base station.

The present invention is able to provide a wireless communication system capable of dealing with even weather that changes abruptly, and capable of keeping communication quality at a certain standard or higher.

BRIEF DESCRIPTION OF THE DRAWINGS

Exemplary features and advantages of the present invention will become apparent from the following detailed description when taken with the accompanying drawings in which:

FIG. 13 is a flowchart for describing an operation of a wireless device according to the background art.

EXAMPLE EMBODIMENT

An example embodiment according to the present invention is able to provide a system dealing with weather that changes abruptly such as guerrilla heavy rain by predicting rainfall with use of meteorological data measured by a meteorometer installed inside or near a wireless base station, and changing a communication parameter. A reason why a meteorometer is installed inside or near a wireless base station is to deal with local weather change. In the example embodiment according to the present invention, rainfall attenuation in a higher frequency range compared with the background art is predicted in advance, and setting change of the device is performed. It does not matter even when data in an observatory of the Japan Meteorological Agency or the like, which is installed in public, for example, are used. In the following, preferred example embodiments according to the present invention are described in detail with reference to the drawings.

First Example Embodiment

Figure 1:
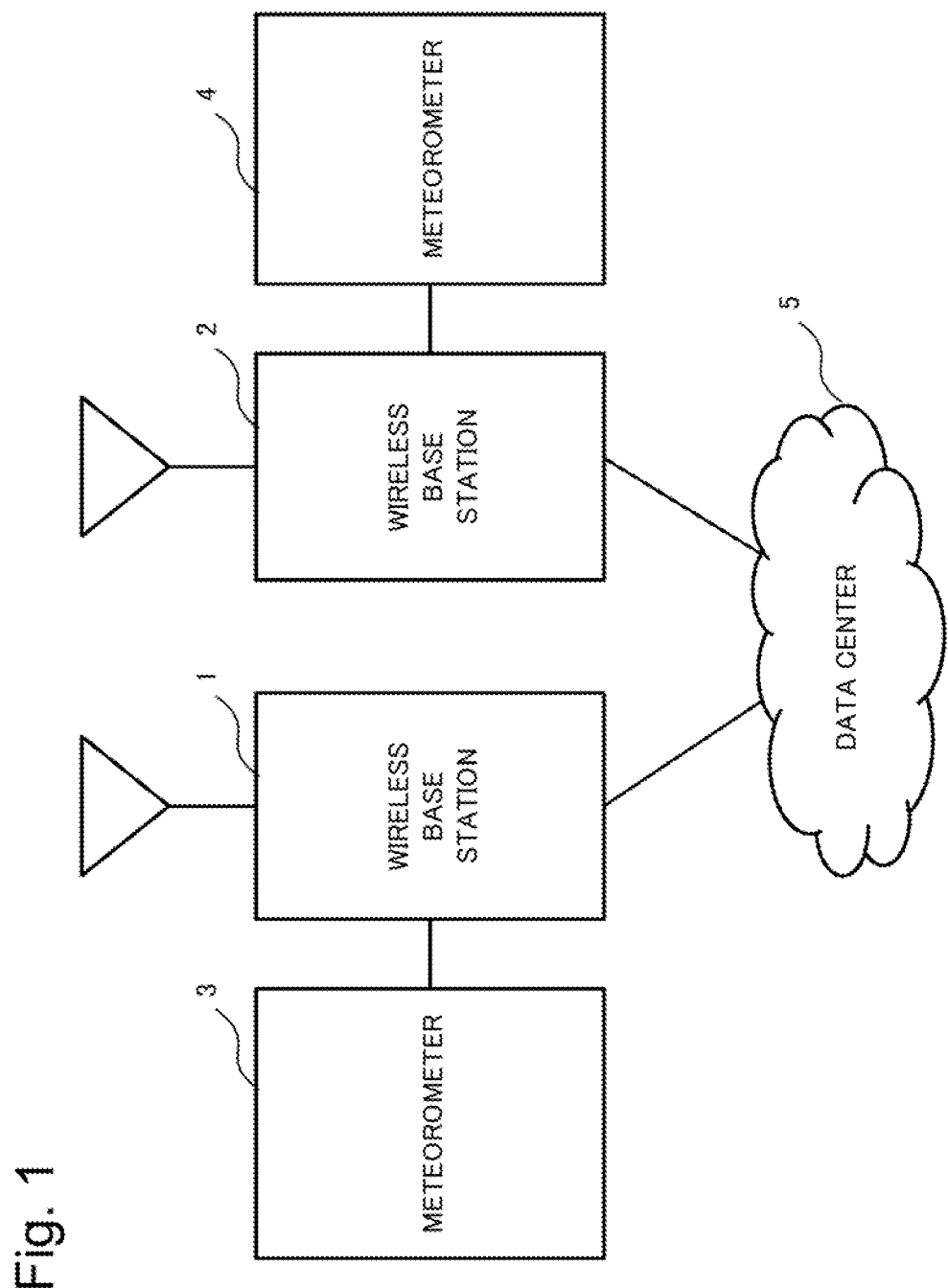
FIG. 1 is a configuration diagram for describing a wireless communication system according to a first example embodiment of the present invention.
Figure 2:
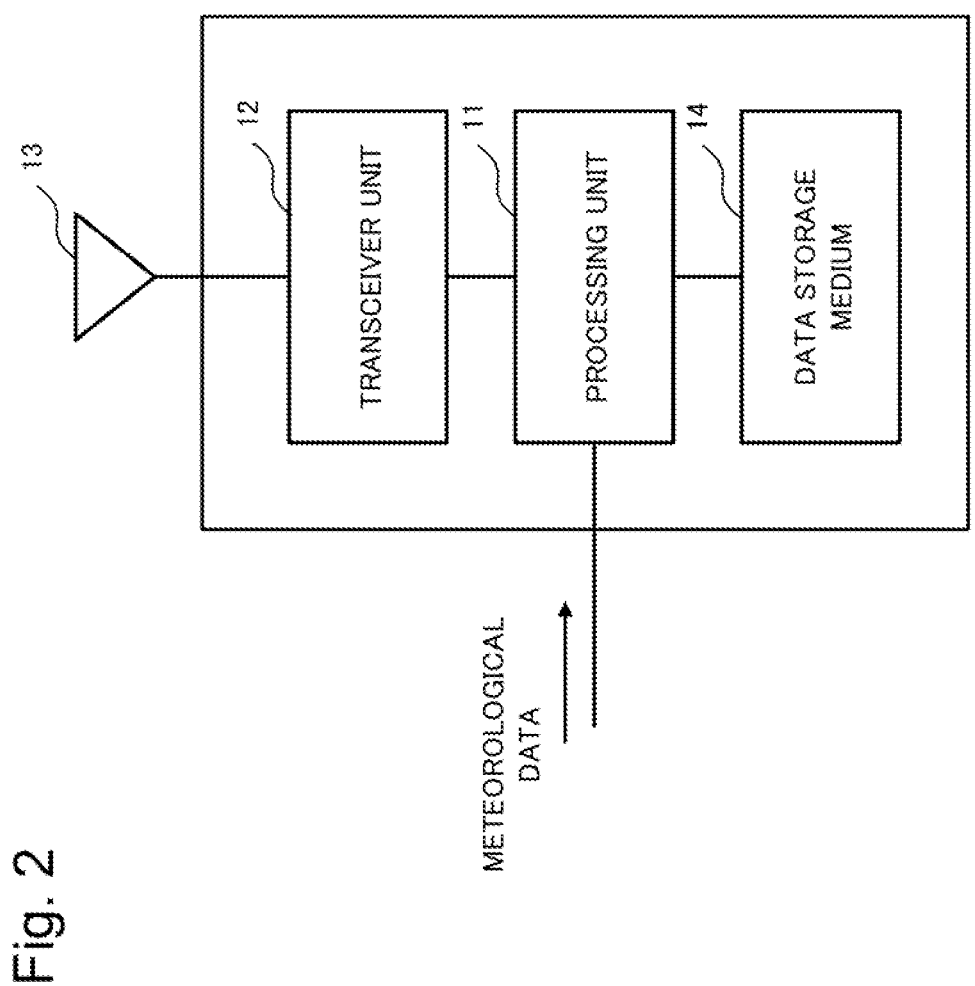
FIG. 2 is a block diagram for describing a wireless base station illustrated in FIG. 1.

First, a wireless communication system, a base station device, and intra-base-station communication according to a first example embodiment of the present invention are described. FIG. 1 is a configuration diagram for describing the wireless communication system according to the first example embodiment of the present invention. FIG. 2 is a block diagram for describing a wireless base station illustrated in FIG. 1.

The wireless communication system illustrated in FIG. 1 comprises a wireless base station 1, a wireless base station 2, a data center 5, a meteorometer 3, and a meteorometer 4. The wireless base station 1 and the wireless base station 2 propagate bi-directionally. It is assumed that the wireless base station 1 and the wireless base station 2 are able to measure received electric power, and are also able to output data on received electric power.

The meteorometer 3 is a meteorometer installed near the wireless base station 1, or installed inside the wireless base station 1. Meteorological data (e.g., rainfall amount, temperature, atmospheric pressure, humidity, and wind rate) measured by the meteorometer 3 are temporarily stored in a data storage medium inside the wireless base station 1.

The meteorometer 4 is a meteorometer installed near the wireless base station 2, or installed inside the wireless base station 2. Meteorological data (e.g., rainfall amount, temperature, atmospheric pressure, humidity, and wind rate) measured by the meteorometer 4 are temporarily stored in a data storage medium inside the wireless base station 2.

The data center 5 performs data backup, data accumulation for deep learning, and deep learning, when there is no vacancy in the data storage medium inside the wireless base station 1, or when there is no vacancy in the data storage medium inside the wireless base station 2. The data center 5 is connected to the wireless base station 1 and the wireless base station 2 by a line such as the Internet.

Each of the wireless base station 1 and the wireless base station 2 in the wireless communication system illustrated in FIG. 1 comprises a processing unit 11, a transceiver unit 12, an antenna 13, and a data storage medium 14, as illustrated in FIG. 2. The data storage medium 14 stores meteorological data from a meteorometer, received electric power at a time of receiving by intra-base-station communication, a control parameter of the transceiver unit 12, and a past parameter. The transceiver unit 12 transmits and receives data to and from an opposing wireless base station via the antenna 13. The processing unit 11 controls the entirety of a wireless base station. In addition to the above, in the present example embodiment, the processing unit 11 has a function of, at a predetermined cycle, referring to meteorological data in a place where a wireless base station is located, changing transmission electric power of the transceiver unit 12 when there is a change in meteorological data and the like, instructing an opposing wireless base station to change transmission electric power, and the like. Next, an operation of the wireless communication system according to the present example embodiment is described.

(Operation of One Wireless Base Station)

Herein, an operation in the wireless base station 1 and the meteorometer 3 of the wireless communication system illustrated in FIG. 1 is described. The wireless base station 2 opposing to the wireless base station 1, and the meteorometer 4 also have a similar flow.

In a case of the wireless communication system illustrated in FIG. 1, which is configured to communicate between wireless base stations, setting of an initial state, and control when there is no change in meteorological data measured by the meteorometer 3 or meteorological data measured by the meteorometer 4 are assumed. Further, in the wireless base station 1, control and the like when there is a change in meteorological data measured by the meteorometer 3 being a meteorometer installed near the wireless base station 1, or installed inside the wireless base station 1, or when there is a change in meteorological data measured by the meteorometer 4 being a meteorometer installed near the opposing wireless base station 2, or installed inside the wireless base station 2 are assumed.

Figure 3:
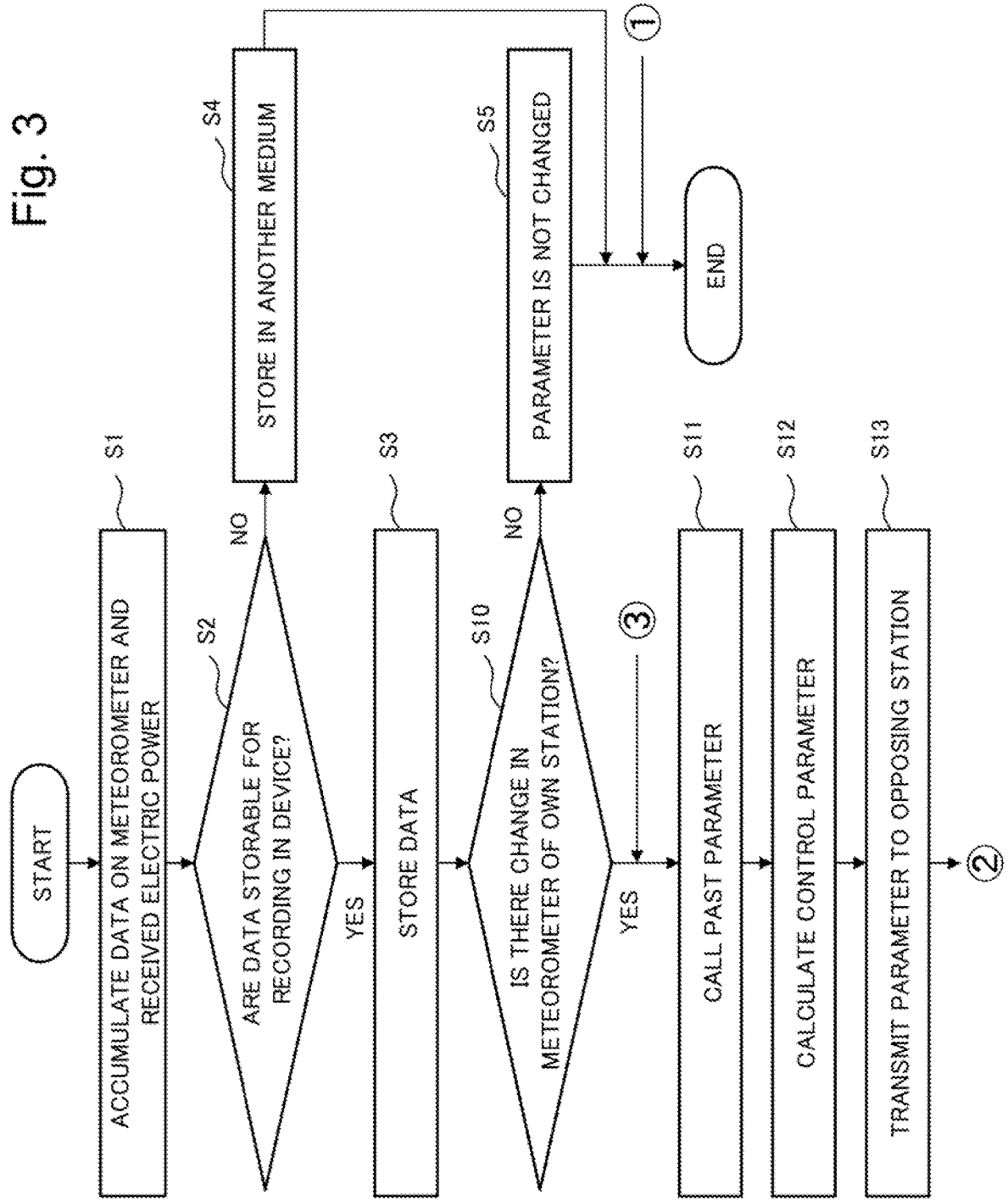
FIG. 3 is a flowchart for describing an operation of the wireless base station illustrated in FIG. 1.

First, setting of an initial state is described. As illustrated in FIG. 3, first, accumulation of data of the meteorometer 3 being measured, and data on received electric power is performed (Step S1). It is determined whether these pieces of data are storable in the data storage medium inside the wireless base station 1 (Step S2).

When data are storable in the data storage medium inside the wireless base station 1 (YES in Step S2), the data are stored in the wireless base station 1 (Step S3). When data are not storable in the data storage medium inside the wireless base station 1 (NO in Step S2), the data are stored in another medium (Step S4). When data are not storable in the data storage medium inside the wireless base station 1, the wireless base station 1 transmits, to the data center 5 connected by a line, data of a meteorometer being measured by the meteorometer 3, and data on received electric power of the wireless base station 1, and stores these pieces of data in the data center 5.

After the data are stored in the wireless base station 1 (Step S3), the wireless base station 1 determines whether there is a change in meteorological data of the meteorometer 3 being a meteorometer installed near the wireless base station 1, or installed inside the wireless base station 1 (Step S10). When there is no change in meteorological data of the meteorometer 3 (NO in Step S10), since changing a current parameter is not necessary, processing is such that the parameter is not changed (Step S5).

When there is a change in meteorological data of the meteorometer 3 (YES in Step S10), the wireless base station 1 performs calling of a past parameter (Step S11). Specifically, the calling of a past parameter is calling a control parameter, which is associated with a change in meteorological data measured by the meteorometer 3 and is set based on similar past meteorological data. The past meteorological data and the control parameter may be accumulated inside the wireless base station 1, or may be called from data accumulated in the data center 5.

When similar past data do not exist as a result of calling a past parameter (Step S11) and it is not possible to call a past parameter, a control parameter that matches with a current change in meteorological data is calculated inside the wireless base station 1 or by the data center 5 (Step S12). Thereafter, the wireless base station 1 transmits the control parameter to the wireless base station 2 opposing to the wireless base station 1 (Step S13).

In this way, when there is no change in meteorological data of the meteorometer 3 being a meteorometer installed near the wireless base station 1, or installed inside the wireless base station 1, processing is such that the parameter is not changed, and when there is a change in meteorological data of the meteorometer 3, a control parameter associated with the change in meteorological data measured by the meteorometer 3 is transmitted to the opposing wireless base station 2. The wireless base station 2 receives the control parameter, and performs transmission output control on the side of the wireless base station 2.

Figure 4:
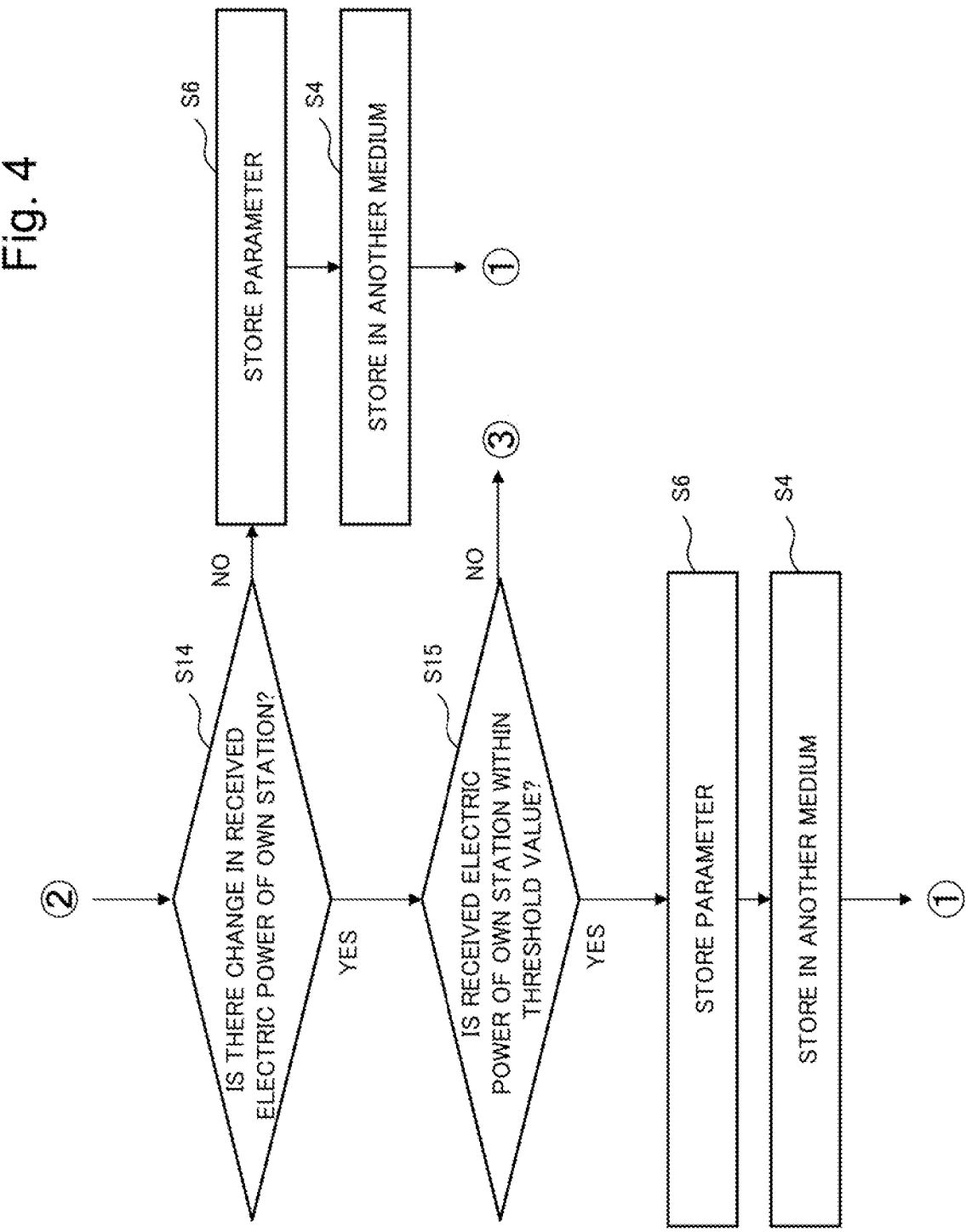
FIG. 4 is a flowchart for describing an operation of the wireless base station illustrated in FIG. 1.

Next, as illustrated in FIG. 4, the wireless base station 1 confirms whether there is a change in received electric power of the own station (Step S14). This confirmation is performed in order to confirm, after a control parameter is transmitted to the opposing wireless base station 2 in Step S13 and transmission output control is performed on the side of the wireless base station 2, whether there is a change in received electric power of the wireless base station 1 being the own station during a predetermined period. When there is no change in received electric power of the wireless base station 1 during the above-described predetermined period (NO in Step S14), the control parameter that is set this time, and the meteorological data measured by the meteorometer 3 are stored in the data storage medium inside the wireless base station 1 (Step S6). When the control parameter and the meteorological data are not storable in the data storage medium inside the wireless base station 1, the control parameter and the meteorological data are stored in another medium (Step S4).

When there is a change in received electric power of the wireless base station 1 during the above-described predetermined period (YES in Step S14), the wireless base station 1 confirms whether received electric power of the own station lies within a threshold value (Step S15). The confirmation as to whether received electric power lies within the threshold value is performed in order to confirm, even when there is a change in received electric power of the own station, whether the change lies within a range that does not degrade communication quality. Generally, when communication quality of a certain level is secured, it is possible to set received electric power within a certain range. When received electric power of the own station lies within the threshold value (YES in Step S15), the control parameter that is set this time, and the meteorological data measured by the meteorometer 3 are stored in the data storage medium inside the wireless base station 1 (Step S6). When the control parameter and the meteorological data are not storable in the data storage medium inside the wireless base station 1, the control parameter and the meteorological data are stored in another medium (Step S4).

In this way, after the control parameter is transmitted to the opposing wireless base station 2 in Step S13, and transmission output control is performed on the side of the wireless base station 2, confirmation is performed as to whether there is a change in received electric power of the wireless base station 1 being the own station during a predetermined period, and the control parameter that is set this time, and the meteorological data measured by the meteorometer 3 are stored according to a result of the confirmation.

Next, control when there is a change in meteorological data measured by the meteorometer 4 being a meteorometer installed near the opposing wireless base station 2 or installed inside the wireless base station 2 is mainly described.

Figure 5:
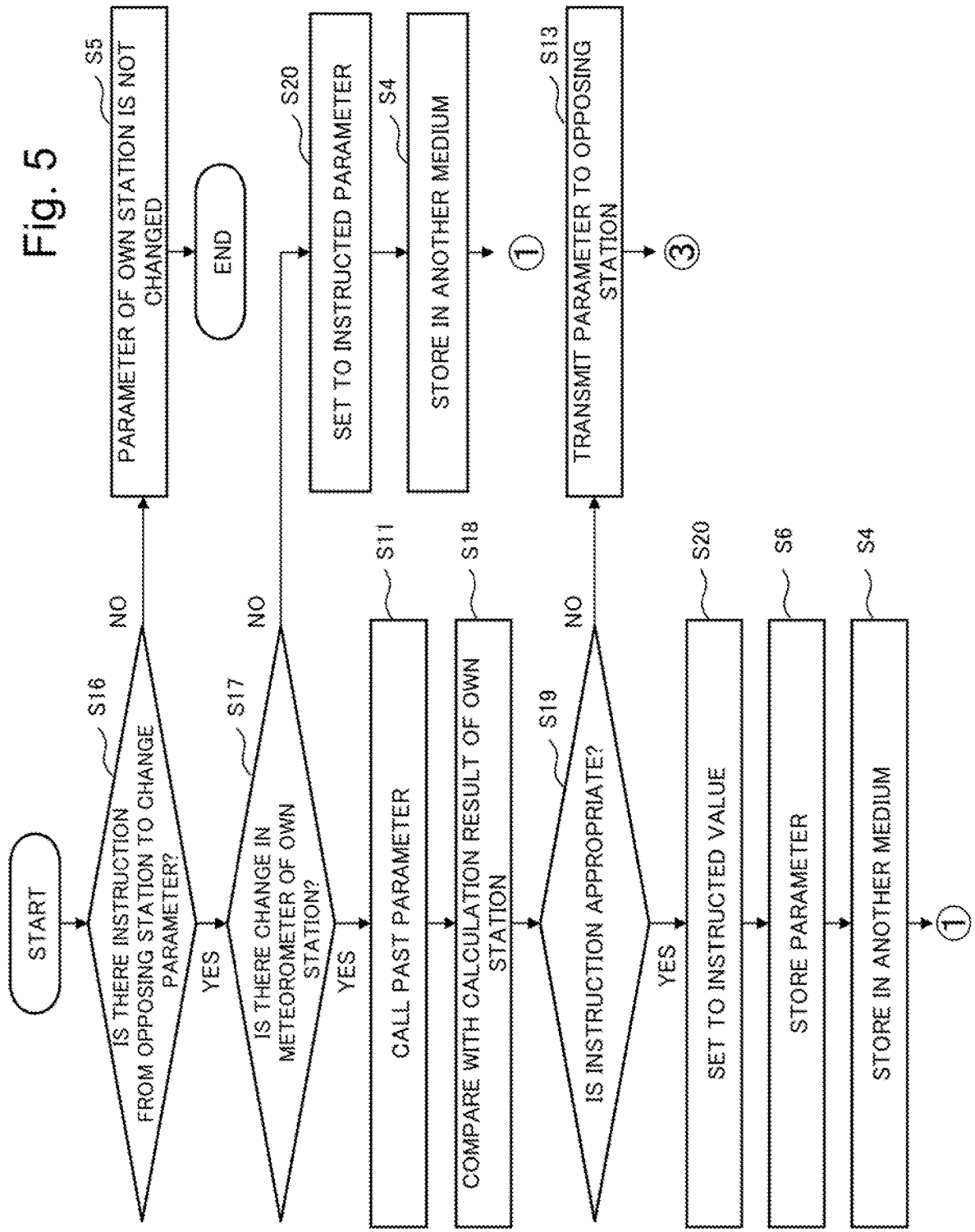
FIG. 5 is a flowchart for describing an operation of the wireless base station illustrated in FIG. 1.

As illustrated in FIG. 5, it is confirmed whether there is an instruction from the wireless base station 2 being the opposing station to change a setting parameter (Step S16). When there is no instruction from the wireless base station 2 to change a setting parameter (NO in Step S16), the wireless base station 1 does not change the control parameter of the own station. In other words, when there is no instruction from the wireless base station 2 being the opposing station to change a setting parameter in a state that there is no change in meteorological data of the meteorometer 3, processing is such that the wireless base station 1 does not change the control parameter of the own station (Step S5).

When there is an instruction from the wireless base station 2 to change a setting parameter (YES in Step S16), the wireless base station 1 confirms whether there is a change in meteorological data of the meteorometer 3 of the own station (Step S17). When there is no change in meteorological data of the meteorometer 3 of the own station (NO in Step S17), the wireless base station 1 sets an instructed setting parameter according to an instruction from the wireless base station 2 being the opposing station (Step S20). Thereafter, the setting parameter is stored in the data storage medium inside the wireless base station 1. When the setting parameter is not storable in the data storage medium inside the wireless base station 1, the setting parameter is stored in another medium (Step S4).

In the wireless base station 1, when there is a change in meteorological data of the meteorometer 3 of the own station (YES in Step S17), the wireless base station 1 performs calling of a past parameter (Step S11). YES in Step S17 indicates a case that there is a change in meteorological data measured by the meteorometer 4, and there is an instruction from the wireless base station 2 being the opposing station to change a setting parameter, and that there is also a change in meteorological data of the meteorometer 3 of the own station. When there is a change in meteorological data both in the own station and the opposing station, comparison is made between a setting parameter that is instructed from the wireless base station 2 to change, and a setting parameter being a calculation result in the own station (Step S18). Step S18 is a comparison as to whether there is a difference in calculated or set parameter between the own station and the opposing station, when there is a change in meteorological data both in the own station and the opposing station.

Next, after a result of the comparison in Step S18 is received, determination is made as to whether the instruction of the wireless base station 2 being the opposing station is appropriate (Step S19). When the instruction of the wireless base station 2 being the opposing station is not appropriate (NO in Step S19), the wireless base station 1 transmits, to the opposing wireless base station 2, the past setting parameter that is called in Step S11 or the calculated setting parameter (Step S13). When the instruction of the wireless base station 2 being the opposing station is appropriate (YES in Step S19), the wireless base station 1 changes the setting parameter to a value instructed from the wireless base station 2 being the opposing station (Step S20). Thereafter, the wireless base station 1 stores the control parameter that is changed and set this time, and the meteorological data measured by the meteorometer 3 in the data storage medium inside the wireless base station 1 (Step S6). When the control parameter and the meteorological data are not storable in the data storage medium inside the wireless base station 1, the control parameter and the meteorological data are stored in another medium (Step S4).

In this way, when there is a change in meteorological data measured by the meteorometer 4 being a meteorometer installed near the opposing wireless base station 2, or installed inside the wireless base station 2, and there is an instruction from the wireless base station 2 being the opposing station to the wireless base station 1 to change a setting parameter, processing is performed according to a determination as to whether there is a change in meteorological data of the meteorometer 3 of the own station or the like.

(Operation of Data Center 5)

Next, an operation in the data center 5 of the wireless communication system illustrated in FIG. 1 is described with reference to FIG. 6. When data are not storable in the data storage medium inside the wireless base station 1, the data center 5 stores meteorological data, received electric power, and a setting parameter for communication, which are transmitted in Step S4 (Step S100). Then, the data center 5 performs machine learning with respect to the data stored in Step S100 (Step S101).

Next, the data center 5 confirms whether a new relational expression is derived (Step S102). This is confirmation as to whether a relational expression on received electric power, transmission electric power, and the like is derived with respect to meteorological data. When a new relational expression is not derived (NO in Step S102), control is ended. When there is novelty as a result of the confirmation in Step S102, a new relational expression is transmitted to each of the wireless base stations (Step S103). Each of the wireless base stations that receives the new relational expression performs parameter calculation from Step S11 (calling a past parameter) and the like by a new parameter. (Change in Weather, and Change in Meteorological Data and the Like)

A time sequential operation of each piece of data when degradation of a propagation characteristic by rainfall occurs is described with reference to FIGS. 7 to 10. It is assumed that meteorological data to be measured by a meteorometer are temperature, humidity, atmospheric pressure, and rainfall amount. The meteorological data indicate a decrease in temperature, an increase in humidity, an increase and a decrease in atmospheric pressure, an increase in rainfall amount, and the like.

Figure 7:
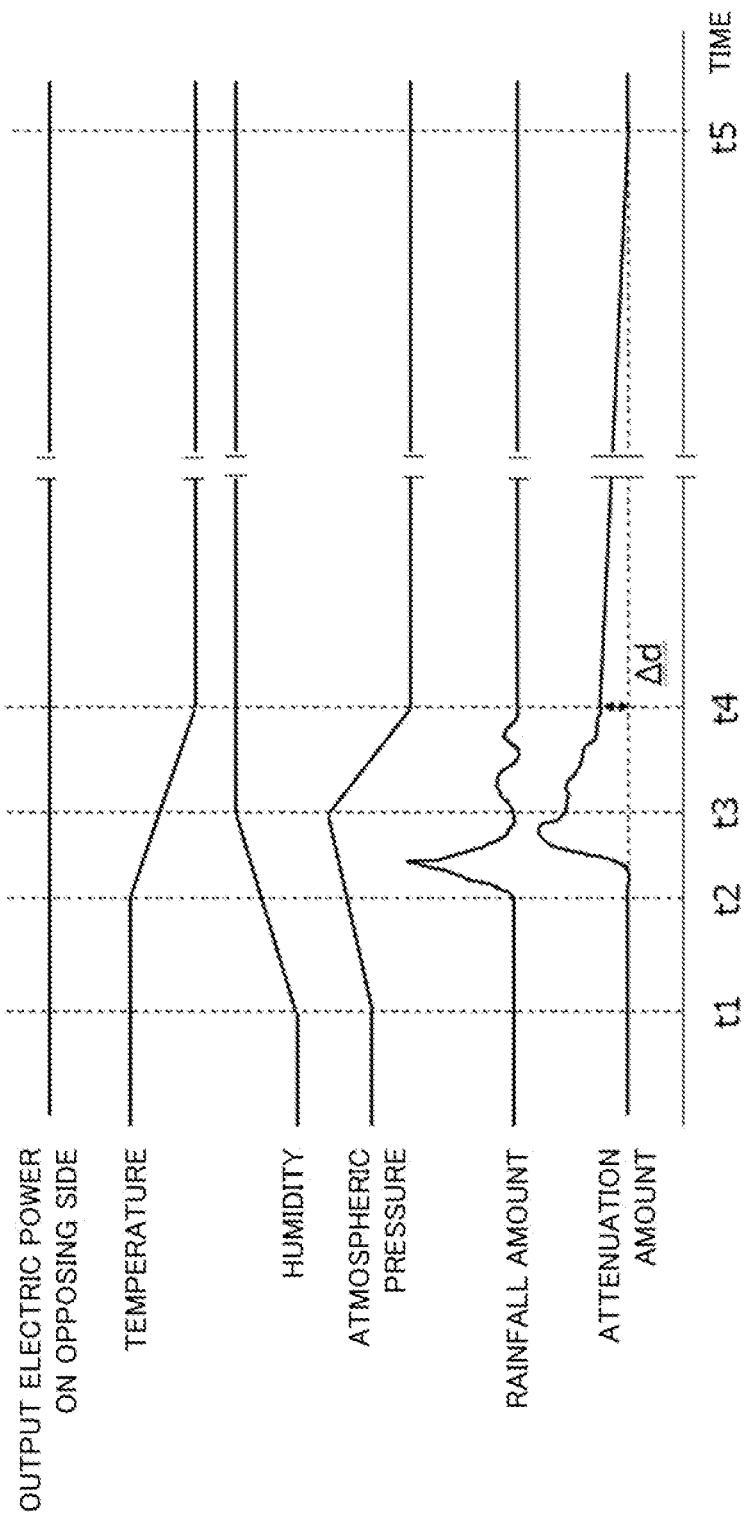
FIG. 7 is a graph for describing a time sequential change in output electric power on an opposing station side, meteorological data measured by a meteorometer, and an attenuation amount according to a background art.

FIG. 7 is a graph describing a time-sequential characteristic change, when a case is assumed such that control according to a weather change such as rainfall is not performed in the wireless device disclosed in JP2003-318795A. In FIG. 7, it is clear that an attenuation amount tends to increase, as a rainfall amount is measured.

Figure 8:
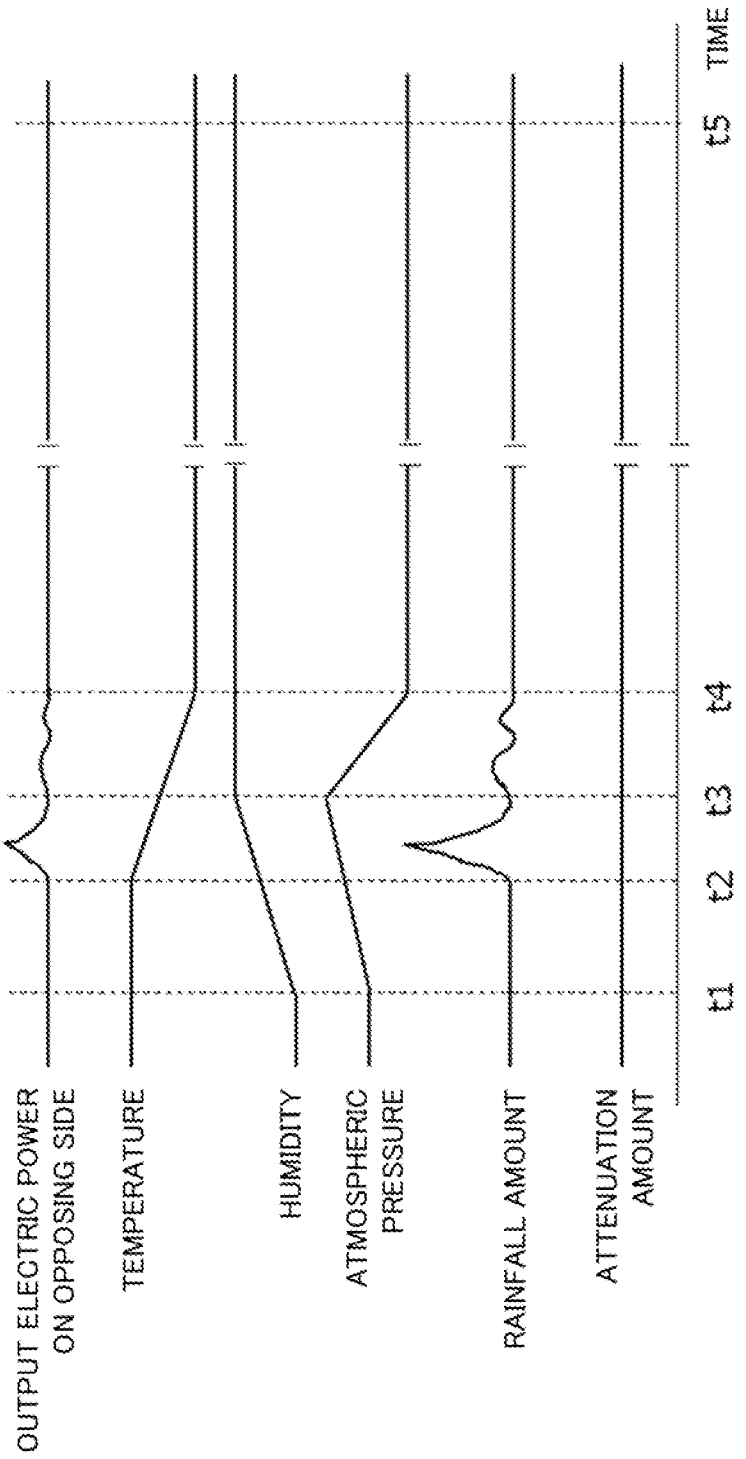
FIG. 8 is a graph for describing a time sequential change in output electric power on an opposing station side, meteorological data measured by a meteorometer, and an attenuation amount according to the background art.

FIG. 8 is a graph describing a time-sequential characteristic change, when a case is assumed such that control according to a weather change such as rainfall is performed, specifically, output electric power on an opposing side is changed in such a way as to correct an attenuation amount by a rainfall amount in the wireless device disclosed in JP2003-318795A. FIG. 8 illustrates an idealistic case in which an attenuation amount by a rainfall amount can be corrected by changing output electric power on the opposing side. However, FIG. 8 illustrates an ideal desk calculation. As is also understood from a thesis in the past such as Olsen, R. L. et al., "The aRb Relation in the Calculation of Rain Attenuation", IEEE TRANSACTIONS ON ANTENNAS AND PROPAGATION, Vol. AP-26, No. 2, pp. 318-329, March 1978, it is clear that, in a case of actual rain, an attenuation amount differs depending on a size and a shape of raindrops, even when a rainfall amount is the same.

Figure 9:
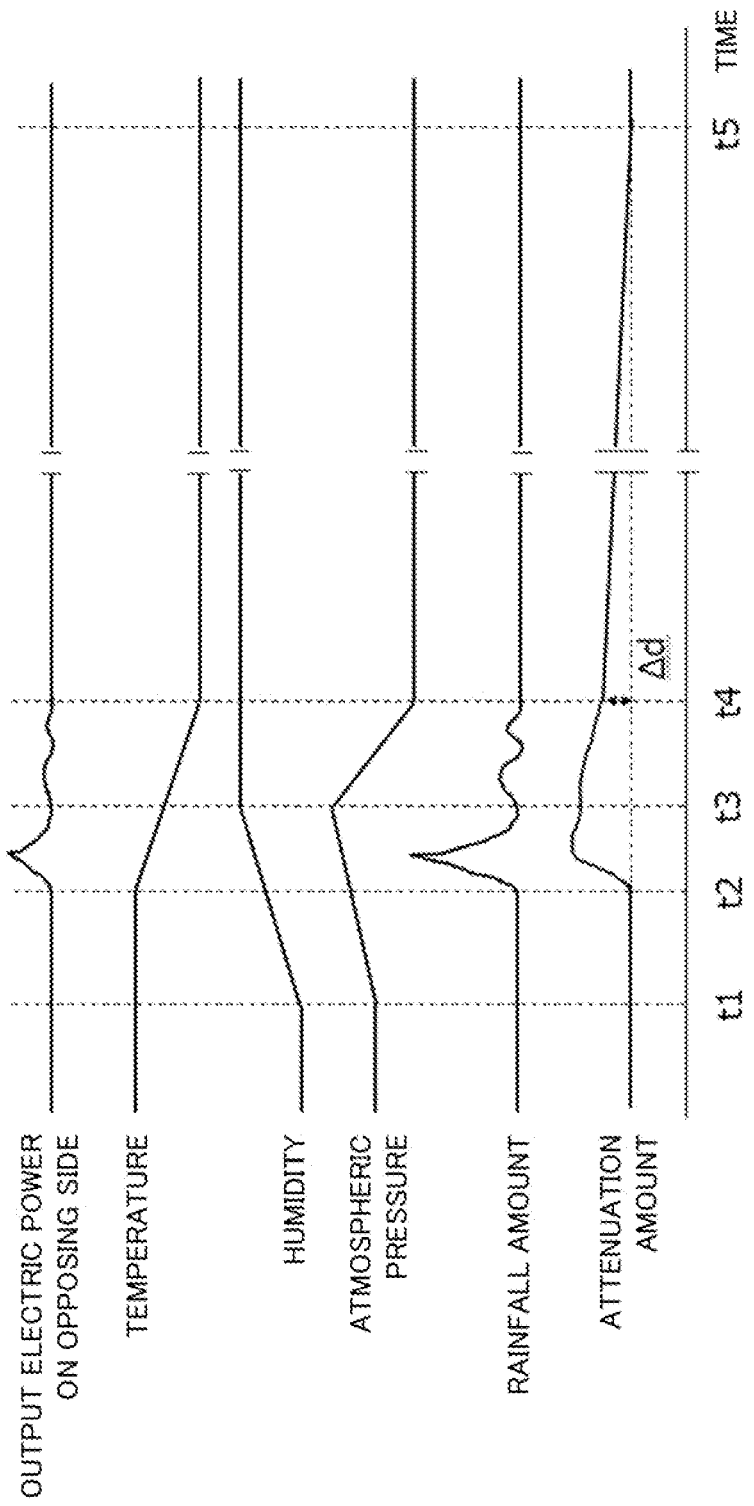
FIG. 9 is a graph for describing a time sequential change in output electric power on an opposing station side, meteorological data measured by a meteorometer, and an attenuation amount according to the background art.

Therefore, actually, even when output electric power of the opposing station is changed, an attenuation amount is not fixed. FIG. 9 is a graph describing an actual time-sequential characteristic change, when control according to a weather change such as rainfall is performed, specifically, output electric power on the opposing side is changed in such a way as to correct an attenuation amount by a rainfall amount in the wireless device disclosed in JP2003-318795A. Actually, as illustrated in FIG. 9, it is revealed that, even when output electric power of the opposing station is changed with respect to a rainfall amount, an attenuation amount is not fixed. This means that a large attenuation amount is equivalent to low received electric power, and communication quality may be degraded unless received electric power falls within a certain range of received electric power. As illustrated in FIGS. 7 and 9, it is revealed that an attenuation amount slowly returns in a time period from t4 to t5 on a time axis. This means that attenuation of received electric power does not abruptly decrease in a state that rainfall is not confirmed. This is because although rain is not falling, a factor other than a rainfall amount, such that an antenna in use is wet, or a radome for protecting an antenna is wet, affects the attenuation amount. In idealistic control illustrated in FIG. 8, it is revealed that at t4 when an attenuation amount inherently becomes zero, an attenuation Ad remains in FIG. 9.

Schematic diagrams illustrated in FIGS. 7 to 9 to be described in the following based on an actual characteristic according to the background art illustrated in FIG. 9 indicate actual measurement data. An advantageous effect of the example embodiment according to the present invention is described with reference to FIG. 10 in addition to the above.

<From t1 to t2>

A period from a time t1 to a time t2 is timings at S10 and S16 in the flowcharts illustrated in FIGS. 3 to 5. This provides confirmation as to whether there is a change in other meteorological data before rain falls. FIG. 9 illustrates that before rain falls, temperature decreases, humidity increases, and atmospheric pressure increases. By data accumulation on a change in these pieces of meteorological data, it is determined whether data matches the rainfall conditions. When it is determined that rain will fall, an instruction to increase output electric power is output to the opposing station, before rain falls. Naturally, since there is a case that rain does not fall, output electric power is increased in a range that received electric power does not exceed a threshold value (see output electric power of the opposing station from the time t1 to the time t2 in FIG. 10).

Meteorological data such as atmospheric pressure, temperature, humidity, and wind change depending on an area and a season, and with time. It is important to grasp in advance a meteorological phenomenon at a certain point of time. By a weather change that rain falls, an action of the other meteorometer differs depending on a place.

<From t2 to t3>

Figure 12:
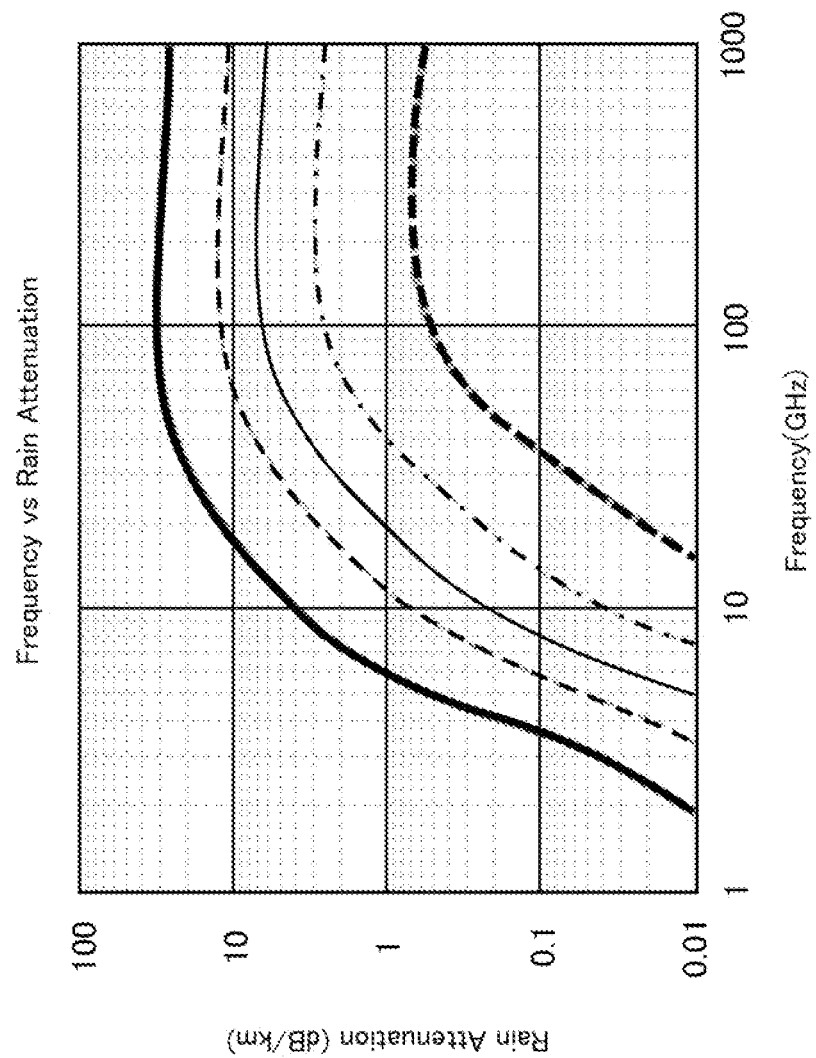
FIG. 12 is a graph illustrating a rainfall attenuation amount with respect to a frequency according to the ITU-R P.838-3.

A period from a time t2 to a time t3 indicates that rainfall is actually confirmed by a meteorometer. As is clear from Olsen, R. L. et al., "The aRb Relation in the Calculation of Rain Attenuation", IEEE TRANSACTIONS ON ANTENNAS AND PROPAGATION, Vol. AP-26, No. 2, pp. 318-329, March 1978, and an experimental result illustrated in FIG. 12, an attenuation amount is not uniquely determined, even when a rainfall amount is the same. This is because a size, a shape, and the like of raindrops are different every time, even when a rainfall amount is the same. Therefore, as illustrated in FIG. 9, in the period from the time t2 to the time t3, an attenuation amount may not be completely corrected (in some cases, an attenuation amount may be corrected too much).

Figure 10:
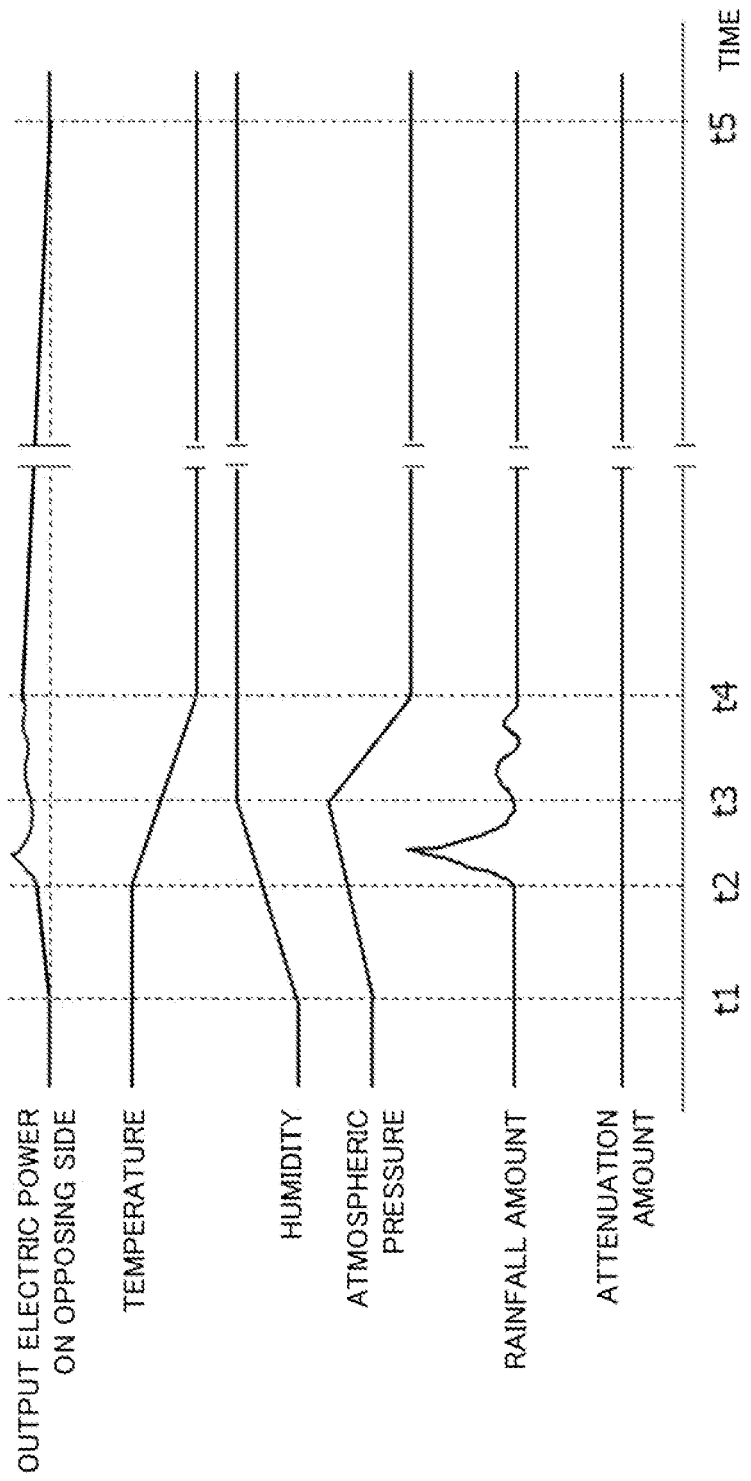
FIG. 10 is a graph for describing a time sequential change in output electric power on an opposing station side, meteorological data measured by a meteorometer, and an attenuation amount according to an example embodiment of the present invention.

As an advantageous effect of the example embodiment according to the present invention, as illustrated in FIG. 10, and also described in the above section <From t1 to t2>, it is clear that output electric power is increased in advance, when it is determined that rain will fall in order to deal with an abrupt change in rainfall amount. By these prediction functions, it becomes possible to deal with the abrupt change in rainfall amount. The prediction functions are calculated and achieved by machine learning illustrated in Step S101 in FIG. 6 from accumulated data.

A difference with respect to the control illustrated in FIG. 9 is that, whereas the control illustrated in FIG. 9 is control such that rain has fallen→attenuation occurs→output electric power is increased, in the control illustrated in FIG. 10, prediction is performed in such a way that it is going to rain→output electric power is increased.

<From t3 to t4>

A period from a time t3 to a time t4 indicates a time period when rain may stop falling. Since rain may stop falling, it is clear in FIG. 9 that output electric power reaches a value approximate to a state in which rain is not falling. However, a certain value is left as an attenuation amount.

Contrary to this, in the example embodiment according to the present invention illustrated in FIG. 10, even in a time period when rain may stop falling, output electric power is changed to some extent similarly to a case that rain is falling according to a result grasped by machine learning. This may also lead to the following description from a time t4 to a time t5. Specifically, as a result of the control, setting is performed such that, when rain has fallen by a certain amount, output electric power is increased according to a result of grasping by machine learning. This is because, by the previously described machine learning, it is clear that also in a time period when rain may stop falling, attenuation occurs due to a factor such that an antenna is wet or a radome is wet, and it is clear that output electric power should be increased. Acquiring inclination data indicating that received electric power returns to original received electric power also enables new information providing by calculating a dryness index (e.g. a drying speed of laundry, or the like) in a certain weather condition. Generally, a rain gauge is expensive, and it is said to be difficult to secure a place for installation. Compared with this, it is possible to purchase inexpensive and easy-to-use thermometers, hygrometers, and barometers at a mass retailer, although precision varies, and it is easy to prepare these products, compared with a rainfall meter. Therefore, even when a rainfall meter cannot be mounted in terms of an expense and the like, as illustrated in FIG. 9, it is possible to refer to a change in atmospheric pressure, as a trigger for determining a time when a rainfall amount becomes stable.

<From t4 to t5>

A period from the time t4 to the time t5 indicates a time period when there is no change as meteorological data measured by a meteorometer. As described in the above-described description on the period from the time t3 to the time t4, this indicates a period during which an antenna, a radome, and the like are dried. Since a drying time is supposed to change depending on meteorological data such as temperature, wind rate, and humidity, it is possible to calculate a period until the time t5 depending on weather conditions that change from time to time by machine learning.

Although there is no change in data of a meteorometer in the period from the time t4 to the time t5, FIG. 10 illustrates that output electric power gradually decreases. By the control according to the present example embodiment, an attenuation amount becomes constant, and this reveals that communication quality of intra-base-station communication is not degraded. In this way, in the example embodiment according to the present invention, meteorological data measured by a meteorometer are referred to, and when there is a change in meteorological data, a control parameter is calculated by calling a past parameter relating to meteorological data. The meteorological data to be referred to in the present example embodiment comprise a rainfall amount, and meteorological data other than the rainfall amount (e.g. temperature, humidity, and atmospheric pressure). Output electric power on the opposing side is increased in association with a change in humidity and atmospheric pressure during a period other than the period from the time t2 to the time t3, during which rainfall is actually confirmed by a meteorometer, for example, in the period from the time t1 to the time t2; or output electric power on the opposing side is increased based on meteorological data measured by a meteorometer on the opposing side. Further, output electric power on the opposing side is increased also during a period other than the period from the time t2 to the time t3, during which rainfall is actually confirmed by a meteorometer, for example, in the period of the time t4 to the time t5; or output electric power on the opposing side is increased based on meteorological data measured by a meteorometer on the opposing side.

Advantageous Effect of Example Embodiment

In the present example embodiment, a base station that performs communication mutually with an opposing base station refers to meteorological data in a place where the own station is located, and when there is a change in the meteorological data, the base station calculates a control parameter for controlling a transceiver unit by calling a past parameter relating to meteorological data, and transmits the calculated control parameter to the opposing base station.

Thus, it is possible to keep communication quality of intra-base-station communication with respect to the opposing base station. A reason for this is that, when there is a change in meteorological data, the base station transmits, to the opposing base station, a control parameter for controlling the transceiver unit by calling a past parameter relating to meteorological data, and controls the transceiver unit of the opposing base station.

It can be said that the example embodiment according to the present invention, which controls output electric power by advance prediction, is advantageous. Further, since momentary interruption by rainfall is not allowed, when a strong wireless line such as a disaster prevention radio is provided, the example embodiment according to the present invention can be said to be an effective means.

Second Example Embodiment

Figure 11:
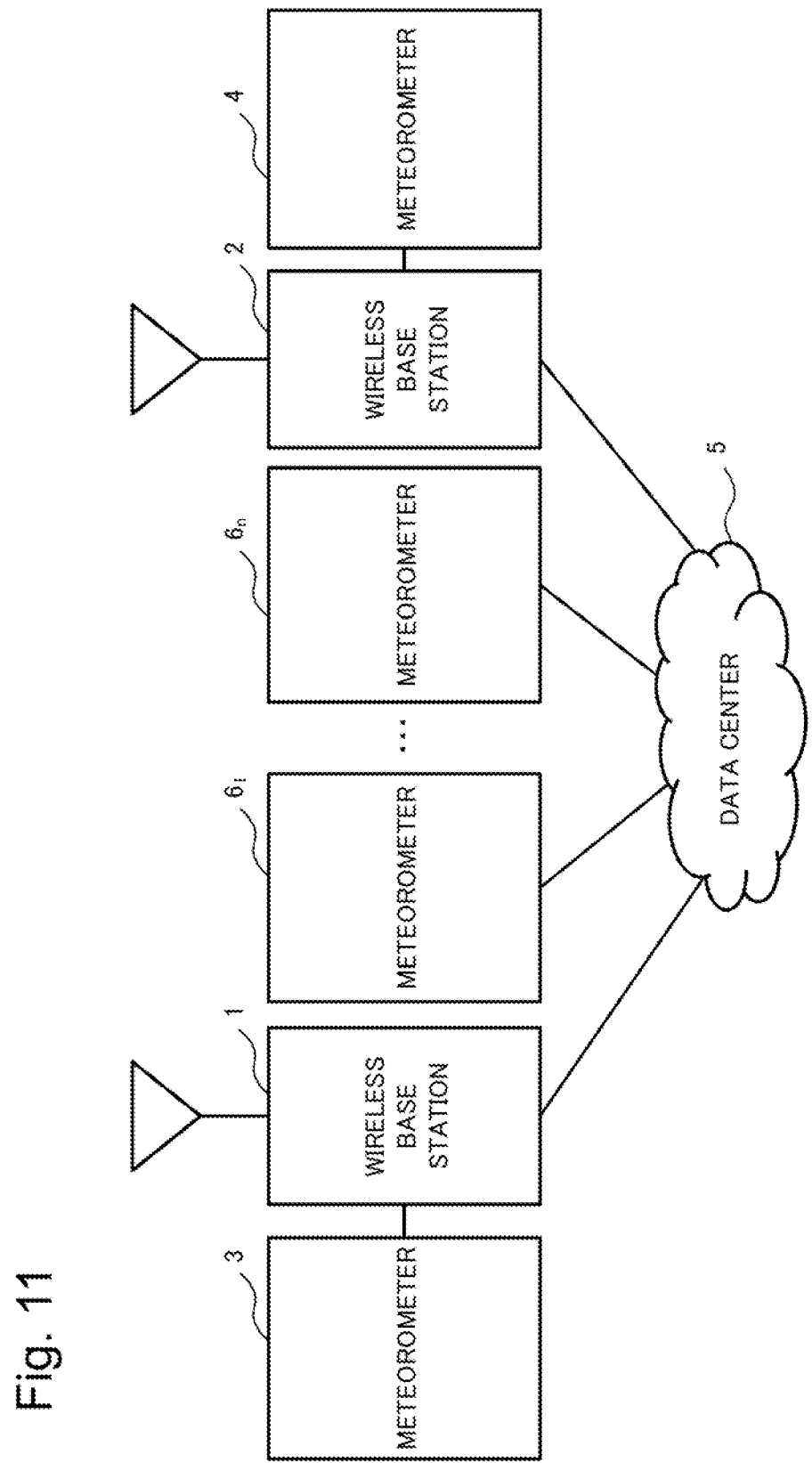
FIG. 11 is a configuration diagram for describing a wireless communication system according to a second example embodiment of the present invention.

Next, a wireless communication system according to a second example embodiment of the present invention is described. FIG. 11 is a configuration diagram for describing the wireless communication system according to the second example embodiment of the present invention. Components similar to those in the first example embodiment are assigned with same reference signs, and detailed description thereof is omitted. The present example embodiment is configured in such a way that, when wireless base stations that mutually perform communication are away from each other, meteorological data are acquired by installing only a meteorometer, without installing another base station or a relay station between the wireless base stations.

Similarly to the first example embodiment, the wireless communication system illustrated in FIG. 11 comprises a wireless base station 1, a wireless base station 2, a data center 5, a meteorometer 3, and a meteorometer 4. The wireless communication system illustrated in FIG. 11 further comprises n meteorometers $6_1$ to $6_n$, which are installed on a communication path between the wireless base station 1 and the wireless base station 2 that perform intra-base-station communication. Each of the n meteorometers $6_1$ to $6_n$ is connected to the data center 5. Note that n is an integer of 1 or larger.

Figure 6:
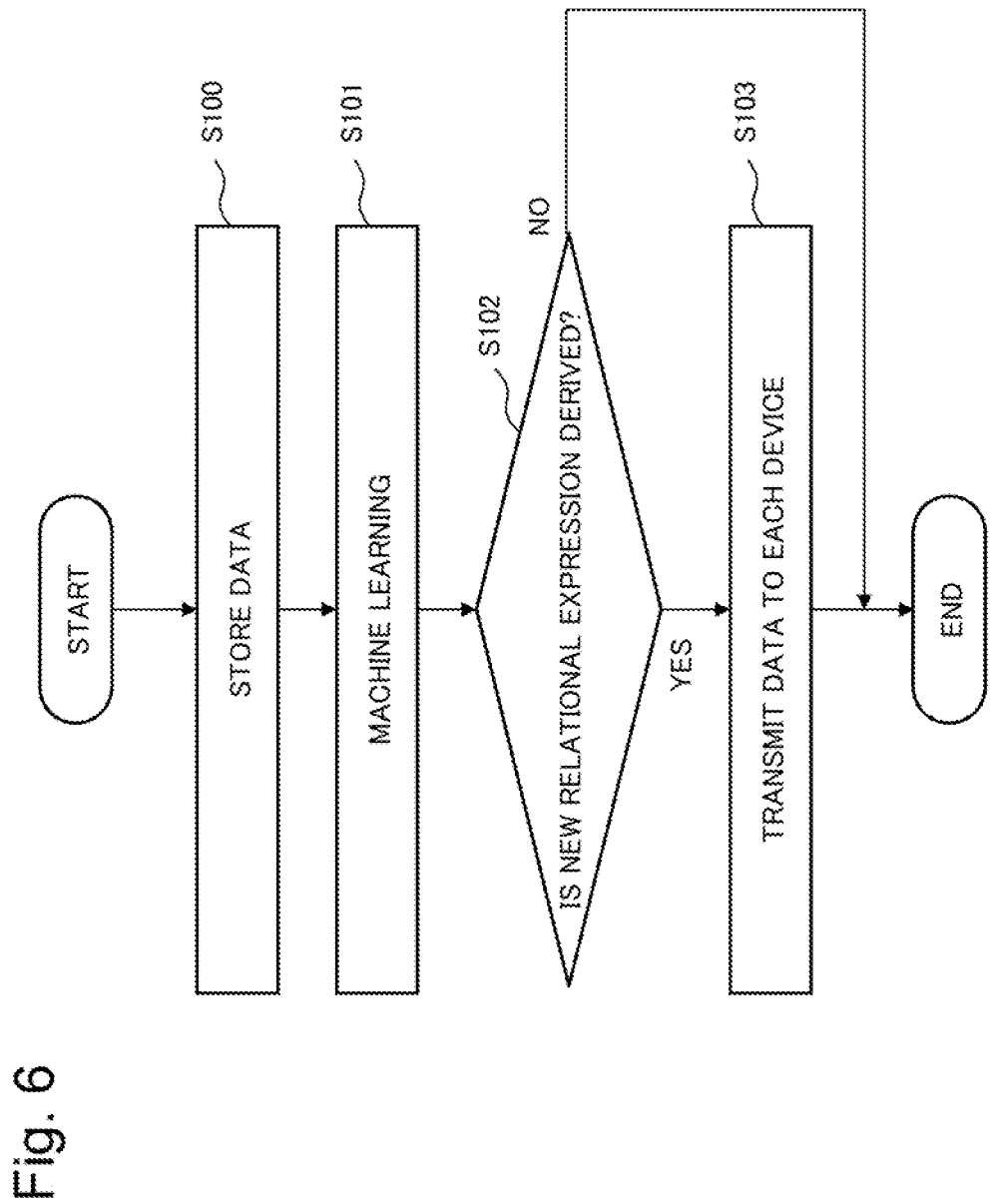
FIG. 6 is a flowchart for describing an operation of a data center illustrated in FIG. 1.

In the present example embodiment, meteorological data (e.g., rainfall amount, temperature, atmospheric pressure, humidity, and wind rate) measured by the n meteorometers $6_1$ to $6_n$ which are installed on a communication path between the wireless base station 1 and the wireless base station 2 that perform intra-base-station communication are transmitted to the data center 5, and used for processing (Steps S100, S101, S102, and S103) in the data center 5 described with reference to FIG. 6.

Advantageous Effect of Example Embodiment

Similarly to the first example embodiment, the present example embodiment is able to keep communication quality of intra-base-station communication with respect to an opposing base station. Further, by collecting meteorological data in a place other than the place where the wireless base station 1 is located and the place where the wireless base station 2 is located, it becomes possible to more advantageously keep communication quality associated with a local weather change, compared with the first example embodiment.

Although a meteorometer is used in the present example embodiment, in some cases, meteorological data measured by a mobile phone or at home may be acquired via the Internet, in place of a meteorometer, and may be used for keeping communication quality associated with a local weather change.

In the foregoing, preferred example embodiments according to the present invention are described. However, the present invention is not limited to the above. Even when meteorological data measured and acquired by a meteorometer are the same, there may be a case that a direction of controlling a control parameter, specifically, a direction of increasing or decreasing a control parameter is different by reflecting a weather condition in the past of an installation place of a meteorometer and a base station, a terrestrial feature, and the like. For this reason, there may be a case that a parameter is predicted or controlled in a direction different from the above-described description of the example embodiments. Therefore, predicting and controlling a parameter in a direction different from the above-described description according to the example embodiments is also included in the scope of the present invention. A meteorometer according to the above-described example embodiments may be installed inside a wireless device. As far as a wireless device is airtight, although a hygrometer cannot be mounted inside the device, a type of a meteorometer may be selected including a cost. Various modifications are available within the scope of the invention defined in the claims, and it is needless to say that these are also included in the scope of the present invention.

The whole or part of the example embodiments disclosed above can be described as, but not limited to, the following supplementary notes.

(Supplementary Note 1)

A base station that performs communication mutually with an opposing base station, the base station comprising:
a transceiver unit being connected to an antenna for the communication; and a processing unit that controls the transceiver unit for the communication by referring to meteorological data in a located place, wherein
the processing unit, at a predetermined cycle,
accumulates a set of meteorological data in the located place, and data on received electric power for the communication by referring to the meteorological data,
when there is a change in the meteorological data, calculates a control parameter for controlling the transceiver unit by calling a past parameter relating to meteorological data, and
causes the calculated control parameter to be transmitted to the opposing base station.

(Supplementary Note 2)

The base station according to supplementary note 1, wherein
the opposing base station
includes a transceiver unit being connected to an antenna for the communication, and a processing unit that controls the transceiver unit for the communication by referring to meteorological data in a place where the opposing base station is located, and
the processing unit of the opposing base station
confirms, after receiving the control parameter, whether there is a change in meteorological data in a place where the opposing base station is located, and when there is a change in meteorological data in a place where the opposing base station is located, controls the transceiver unit of the opposing base station, based on the received control parameter.

(Supplementary Note 3)

The base station according to supplementary note 1 or 2, wherein
the processing unit
confirms, after causing the calculated control parameter to be transmitted to the opposing base station, whether there is a change in received electric power of an own station, and,
when there is a change in received electric power of the own station, controls the transceiver unit by a control parameter being received from the opposing base station.

(Supplementary Note 4)

The base station according to supplementary note 3, wherein
the processing unit
confirms, in confirming whether there is a change in received electric power of the own station, whether received electric power of the own station lies within a preset threshold value when there is a change in received electric power of the own station, and,
when received electric power of the own station does not lie within a preset threshold value, calculates a control parameter by calling a past parameter relating to meteorological data, and causes the calculated control parameter to be transmitted to the opposing base station.

(Supplementary Note 5)

The base station according to supplementary note 3, wherein
the processing unit
confirms, in confirming whether there is a change in received electric power of the own station, whether received electric power of the own station lies within a preset threshold value when there is a change in received electric power of the own station, and,
when received electric power of the own station lies within a preset threshold value, controls the transceiver unit by a control parameter being received from the opposing base station.

(Supplementary Note 6)

The base station according to any one of supplementary notes 1 to 5, wherein
the processing unit
confirms at a predetermined cycle whether there is an instruction from the opposing base station to change a control parameter for controlling the transceiver unit of an own station,
when there is an instruction to change the control parameter, confirms whether there is a change in meteorological data in a place where the own station is located, and,
when there is no change in meteorological data in a place where the own station is located, controls the transceiver unit by a control parameter being received from the opposing base station.

(Supplementary Note 7)

The base station according to any one of supplementary notes 1 to 5, wherein the processing unit confirms at a predetermined cycle whether there is an instruction from the opposing base station to change a control parameter for controlling the transceiver unit of an own station, when there is an instruction to change the control parameter, confirms whether there is a change in meteorological data in a place where the own station is located, and, when there is a change in meteorological data in a place where the own station is located, calculates a control parameter for controlling the transceiver unit by calling a past parameter relating to meteorological data, and confirms appropriateness of an instruction to change a control parameter from the opposing base station by comparing a calculated control parameter with a control parameter from the opposing base station.

(Supplementary Note 8)

The base station according to any one of supplementary notes 1 to 7, wherein the processing unit controls the transceiver unit for the communication by further referring to meteorological data in a place on a communication path between an own station and the opposing base station.

(Supplementary Note 9)

A wireless communication system comprising:

a first base station; and a second base station that performs communication mutually with the first base station, wherein each of the first base station and the second base station includes a transceiver unit being connected to an antenna for the communication, and a processing unit that controls the transceiver unit for the communication by referring to meteorological data in a place where the base station is located, and the processing unit of the first base station, at a predetermined cycle, accumulates a set of meteorological data in a place where the first base station is located, and data on received electric power for the communication by referring to the meteorological data, when there is a change in the meteorological data, calculates a control parameter for controlling the transceiver unit by calling a past parameter relating to meteorological data, and causes the calculated control parameter to be transmitted to the second base station.

(Supplementary Note 10)

The wireless communication system according to supplementary note 9, wherein the processing unit of the second base station confirms, after receiving the control parameter from the first base station, whether there is a change in meteorological data in a place where the second base station is located, and, when there is a change in meteorological data in a place where the second base station is located, controls the transceiver unit of the second base station, based on the control parameter being received from the first base station.

(Supplementary Note 11)

The wireless communication system according to supplementary note 9 or 10, wherein the processing unit of the first base station confirms, after causing the calculated control parameter to be transmitted to the second base station, whether there is a change in received electric power of the first base station, and, when there is a change in received electric power of the first base station, controls the transceiver unit of the first base station by a control parameter being received from the second base station.

(Supplementary Note 12)

The wireless communication system according to supplementary note 11, wherein the processing unit of the first base station confirms, in confirming whether there is a change in received electric power of the first base station, whether received electric power of the first base station lies within a preset threshold value when there is a change in received electric power of the first base station, and, when received electric power of the first base station does not lie within a preset threshold value, calculates a control parameter by calling a past parameter relating to meteorological data, and causes the calculated control parameter to be transmitted to the second base station.

(Supplementary Note 13)

The wireless communication system according to supplementary note 11, wherein the processing unit of the first base station confirms, in confirming whether there is a change in received electric power of the first base station, whether received electric power of the first base station lies within a preset threshold value when there is a change in received electric power of the first base station, and when received electric power of the first base station lies within a preset threshold value, controls the transceiver unit of the first base station by a control parameter being received from the second base station.

(Supplementary Note 14)

The wireless communication system according to any one of supplementary notes 9 to 13, wherein the processing unit of the first base station confirms at a predetermined cycle whether there is an instruction from the second base station to change a control parameter for controlling the transceiver unit of the first base station, when there is an instruction to change the control parameter, confirms whether there is a change in meteorological data in a place where the first base station is located, and, when there is no change in meteorological data in a place where the first base station is located, controls the transceiver unit of the first base station by a control parameter being received from the second base station.

(Supplementary Note 15)

The wireless communication system according to any one of supplementary notes 9 to 13, wherein the processing unit of the first base station confirms at a predetermined cycle whether there is an instruction from the second base station to change a control parameter for controlling the transceiver unit of the first base station, when there is an instruction to change the control parameter, confirms whether there is a change in meteorological data in a place where the first base station is located, and, when there is a change in meteorological data in a place where the first base station is located, calculates a control parameter for controlling the transceiver unit by calling a past parameter relating to meteorological data, and confirms appropriateness of an instruction to change a control parameter from the second base station by comparing a calculated control parameter with a control parameter from the second base station.

(Supplementary Note 16)

The wireless communication system according to any one of supplementary notes 9 to 15, wherein the processing unit of the first base station controls the transceiver unit of the first base station for the communication by further referring to meteorological data in a place on a communication path between the first base station and the second base station.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A base station that performs communication mutually with an opposing base station, the base station comprising:
a transceiver connected to an antenna for the communication; and a processor that controls the transceiver for the communication by referring to meteorological data in a located place, wherein
the processor, at a predetermined cycle,
accumulates a set of meteorological data in the located place, and data on received electric power for the communication by referring to the meteorological data,
when there is a change in the meteorological data, calculates a control parameter for controlling the transceiver by calling a past parameter relating to meteorological data, and
causes the calculated control parameter to be transmitted to the opposing base station, and
wherein
the processor confirms, after causing the calculated control parameter to be transmitted to the opposing base station, whether there is a change in received electric power of an own station, and,
when there is a change in received electric power of the own station, controls the transceiver by a control parameter being received from the opposing base station.

2. The base station according to claim 1, wherein
the processor
confirms, in confirming whether there is a change in received electric power of the own station, whether received electric power of the own station lies within a preset threshold value when there is a change in received electric power of the own station, and,
when received electric power of the own station does not lie within a preset threshold value, calculates a control parameter by calling a past parameter relating to meteorological data, and causes the calculated control parameter to be transmitted to the opposing base station.

3. The base station according to claim 1, wherein
the processor
confirms, in confirming whether there is a change in received electric power of the own station, whether received electric power of the own station lies within a preset threshold value when there is a change in received electric power of the own station, and,
when received electric power of the own station lies within a preset threshold value, controls the transceiver by a control parameter being received from the opposing base station.

4. The base station according to claim 1, wherein
the processor
confirms at a predetermined cycle whether there is an instruction from the opposing base station to change a control parameter for controlling the transceiver of an own station,
when there is an instruction to change the control parameter, confirms whether there is a change in meteorological data in a place where the own station is located, and,
when there is no change in meteorological data in a place where the own station is located, controls the transceiver by a control parameter being received from the opposing base station.

5. The base station according to claim 1, wherein
the processor
confirms at a predetermined cycle whether there is an instruction from the opposing base station to change a control parameter for controlling the transceiver of an own station,
when there is an instruction to change the control parameter, confirms whether there is a change in meteorological data in a place where the own station is located, and,
when there is a change in meteorological data in a place where the own station is located, calculates a control parameter for controlling the transceiver by calling a past parameter relating to meteorological data, and confirms appropriateness of an instruction to change a control parameter from the opposing base station by comparing a calculated control parameter with a control parameter from the opposing base station.

6. The base station according to claim 1, wherein
the processor
controls the transceiver for the communication by further referring to meteorological data in a place on a communication path between an own station and the opposing base station.

7. A wireless communication system comprising:
a first base station; and a second base station that performs communication mutually with the first base station, wherein
each of the first base station and the second base station
includes a transceiver connected to an antenna for the communication, and a processor that controls the transceiver for the communication by referring to meteorological data in a place where the base station is located, and
the processor of the first base station, at a predetermined cycle,
accumulates a set of meteorological data in a place where the first base station is located, and data on received electric power for the communication by referring to the meteorological data,
when there is a change in the meteorological data, calculates a control parameter for controlling the transceiver by calling a past parameter relating to meteorological data, and
causes the calculated control parameter to be transmitted to the second base station, and wherein the processor of the first base station confirms, after causing the calculated control parameter to be transmitted to the second base station, whether there is a change in received electric power of the first base station, and, when there is a change in received electric power of the first base station, controls the transceiver of the first base station by a control parameter being received from the second base station.

8. The wireless communication system according to claim 7, wherein the processor of the first base station confirms, in confirming whether there is a change in received electric power of the first base station, whether received electric power of the first base station lies within a preset threshold value when there is a change in received electric power of the first base station, and, when received electric power of the first base station does not lie within a preset threshold value, calculates a control parameter by calling a past parameter relating to meteorological data, and causes the calculated control parameter to be transmitted to the second base station.

9. The wireless communication system according to claim 7, wherein the processor of the first base station confirms, in confirming whether there is a change in received electric power of the first base station, whether received electric power of the first base station lies within a preset threshold value when there is a change in received electric power of the first base station, and, when received electric power of the first base station lies within a preset threshold value, controls the transceiver of the first base station by a control parameter being received from the second base station.

10. The wireless communication system according to claim 7, wherein the processor of the first base station confirms at a predetermined cycle whether there is an instruction from the second base station to change a control parameter for controlling the transceiver of the first base station, when there is an instruction to change the control parameter, confirms whether there is a change in meteorological data in a place where the first base station is located, and, when there is no change in meteorological data in a place where the first base station is located, controls the transceiver of the first base station by a control parameter being received from the second base station.

11. The wireless communication system according to claim 7, wherein the processor of the first base station confirms at a predetermined cycle whether there is an instruction from the second base station to change a control parameter for controlling the transceiver of the first base station, when there is an instruction to change the control parameter, confirms whether there is a change in meteorological data in a place where the first base station is located, and, when there is a change in meteorological data in a place where the first base station is located, calculates a control parameter for controlling the transceiver by calling a past parameter relating to meteorological data, and confirms appropriateness of an instruction to change a control parameter from the second base station by comparing a calculated control parameter with a control parameter from the second base station.

12. The wireless communication system according to claim 7, wherein the processor of the first base station controls the transceiver of the first base station for the communication by further referring to meteorological data in a place on a communication path between the first base station and the second base station.

13. A base station that performs communication mutually with an opposing base station, the base station comprising:

a transceiver connected to an antenna for the communication; and a processor that controls the transceiver for the communication by referring to meteorological data in a located place, wherein the processor, at a predetermined cycle, accumulates a set of meteorological data in the located place, and data on received electric power for the communication by referring to the meteorological data, when there is a change in the meteorological data, calculates a control parameter for controlling the transceiver by calling a past parameter relating to a meteorological data, and causes the calculated control parameter to be transmitted to the opposing base station, and wherein the opposing base station includes a transceiver being connected to an antenna for the communication, and a processor that controls the transceiver for the communication by referring to meteorological data in a place where the opposing base station is located, and the processor of the opposing base station confirms, after receiving the control parameter, whether there is a change in meteorological data in a place where the opposing base station is located, and when there is a change in meteorological data in a place where the opposing base station is located, controls the transceiver of the opposing base station, based on the received control parameter.

* * * * *